(12) United States Patent
Ito et al.

(10) Patent No.: US 6,244,403 B1
(45) Date of Patent: Jun. 12, 2001

(54) POWER TRANSMISSION DEVICE FOR HYBRID CARS

(75) Inventors: Kenichiro Ito; Makoto Yasui; Shiro Goto, all of Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/354,089

(22) Filed: Jul. 15, 1999

(30) Foreign Application Priority Data

Jul. 16, 1998 (JP) .................................................. 10-201742

(51) Int. Cl.[7] .................................................. B60K 23/08
(52) U.S. Cl. ............................ 192/35; 192/44; 192/84.1
(58) Field of Search ................. 192/35, 43, 44, 192/84.1

(56) References Cited

U.S. PATENT DOCUMENTS

| | | | |
|---|---|---|---|
| 4,030,581 | * 6/1977 | Giometti | 192/44 X |
| 4,499,980 | * 2/1985 | Kaminski et al. | 192/35 |
| 5,007,498 | * 4/1991 | Wiese et al. | 192/35 X |
| 5,265,707 | * 11/1993 | Abe et al. | 192/35 X |
| 5,348,126 | * 9/1994 | Gao | 192/35 X |

FOREIGN PATENT DOCUMENTS 9-95149   4/1997 (JP) .

* cited by examiner

*Primary Examiner*—Charles A Marmor
*Assistant Examiner*—Saúl Rodríguez
(74) *Attorney, Agent, or Firm*—Wenderoth, Lind & Ponack, L.L.P.

(57) ABSTRACT

This invention pertains to a power transmission device suited for use in a hybrid car for selective transmission of its engine and motor powers. The power transmission device is used to transmit and cut off driving forces from an internal combustion engine or a motor of a hybrid car, and includes a two-way clutch having engaging elements, and a control mechanism for controlling the locking and freeing of the two-way clutch. The control mechanism includes an electromagnetic clutch having an electromagnet and an armature. By mounting such power transmission devices on the outputs of the engine and the motor, it is possible to easily transmit and cut off driving force by simply turning on and off the electromagnet.

22 Claims, 14 Drawing Sheets idling ↔ driving

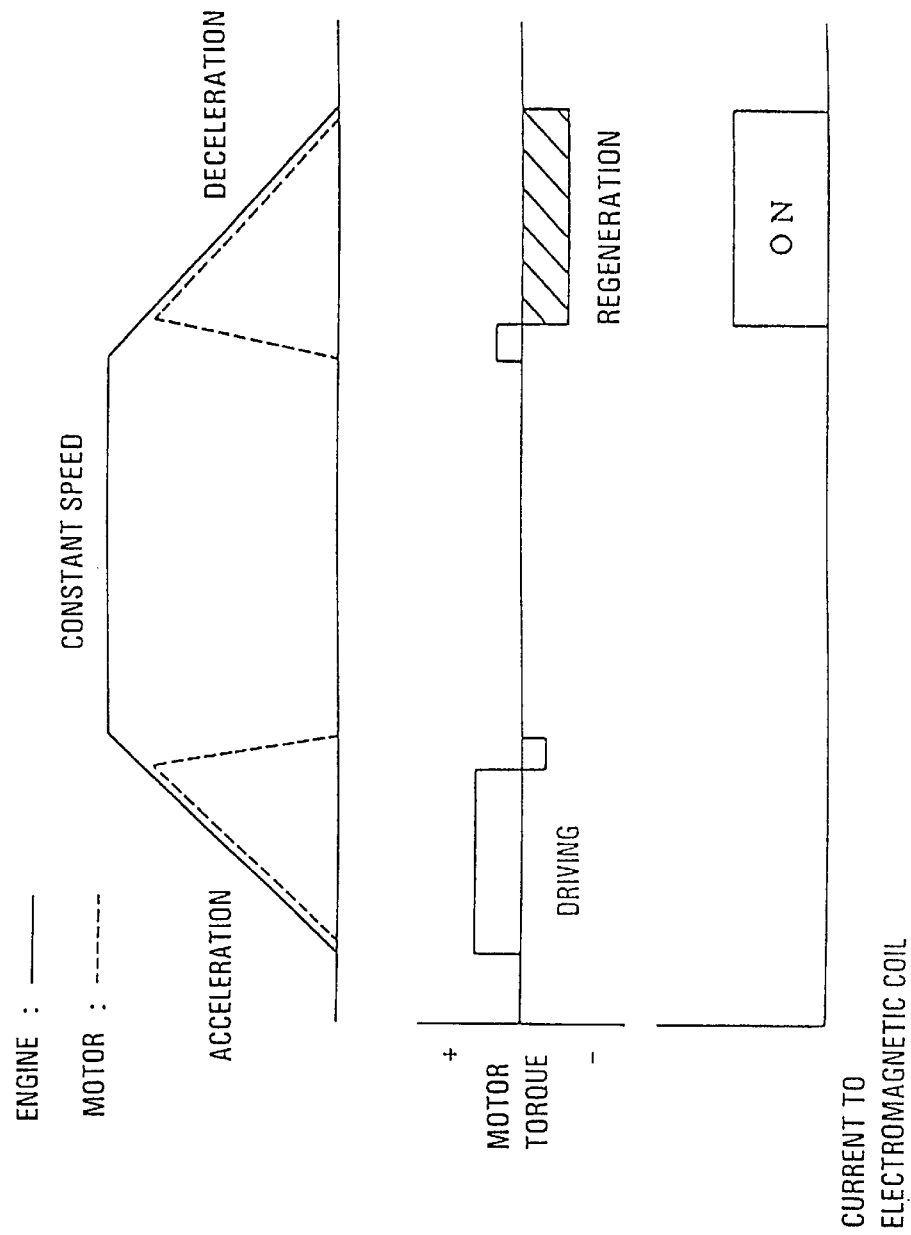

FIG. 16
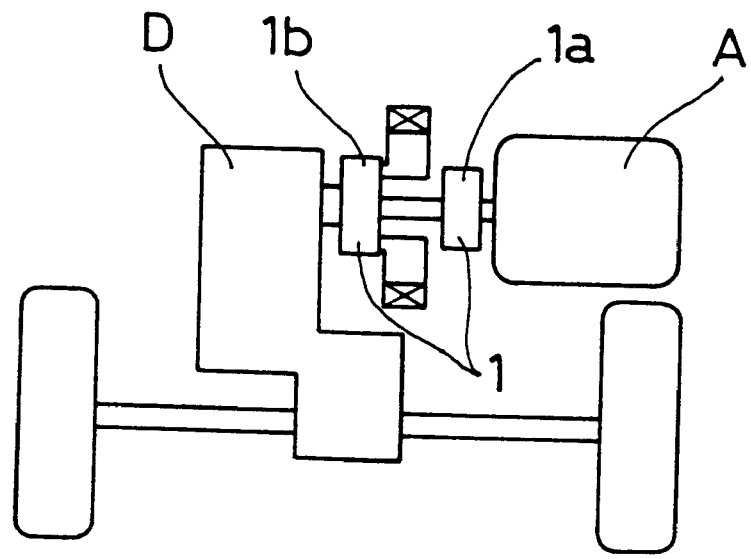
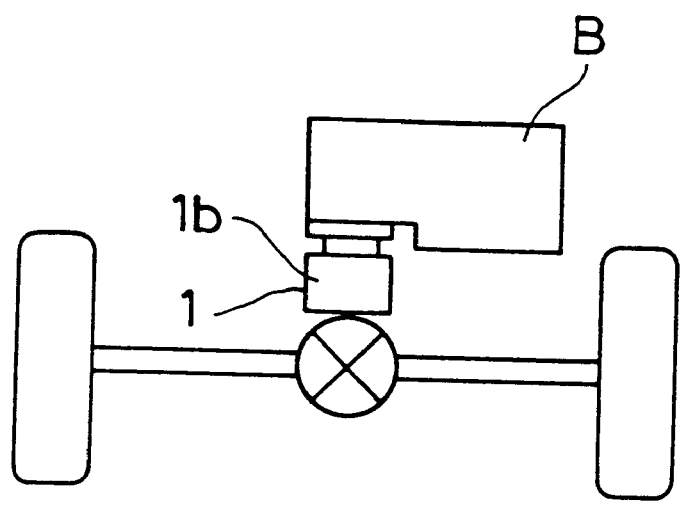

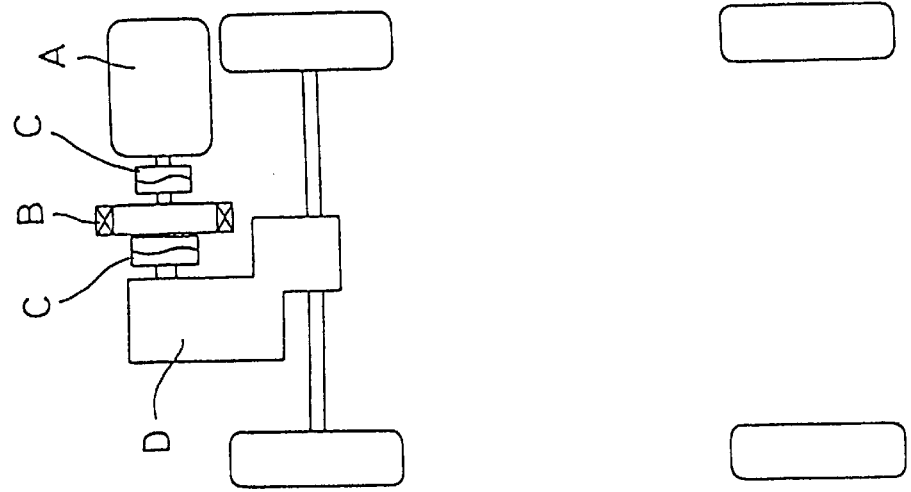
PRIOR ART FIG. 17A
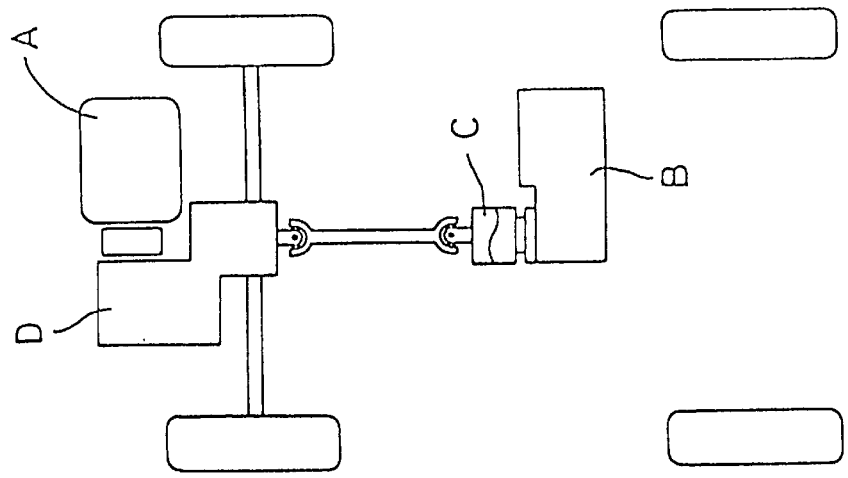
PRIOR ART FIG. 17B

POWER TRANSMISSION DEVICE FOR HYBRID CARS

BACKGROUND OF THE INVENTION

This invention relates to a power transmission device for use in a hybrid car, a recently developed car having a second driving source, i.e. an electric motor besides the conventional internal combustion engine, and more particularly to a power transmission device for selectively connecting the engine and/or the motor to the drive train.

The motor and the engine of a hydrid car are automatically connected to and disconnected from the drive train according to their respective revolving speeds so as to improve the total fuel economy. Generally, while the car is accelerating, the motor delivers power to the traction wheels, and while the car is decelerating, the motor serves as a generator by being driven by the traction wheels. Electric power thus generated is stored for later use.

A clutch is needed to automatically connect and disconnect the motor and the engine to and from the drive train. Such a clutch has to be one that is automatically controlled according to the state of car.

FIG. 17A shows a typical drive train arrangement of hybrid cars, in which the internal combustion engine A (hereinafter simply "engine") and the motor B have their output shafts arranged in series. In this arrangement, when the car starts or while it is traveling at a low speed, only the motor B is used to drive the car, while the engine A is at a stop. To keep the engine A at a stop, its output shaft is disconnected from the drive train by disengaging an electromagnetic clutch or brake C. Another electromagnetic clutch or brake C is used to disconnect the motor B from the transmission D to keep the transmission D neutral.

FIG. 17B shows another drive train layout of a hybrid car, which is disclosed e.g. in unexamined Japanese patent publication 9-95149. In this arrangement, the motor B is connected to the rear propeller shaft, while the engine A is connected to the transmission D. Thus, not only the engine power delivered through the transmission D but also the motor power are transmitted to the front vehicle wheels through the front differential and the front wheel axles.

In this arrangement, the engine A is rotating at all times, and the motor B assists the engine while the car is accelerating. While it is decelerating, the traction wheels drive the motor for regeneration. The motor B is connected to the rear propeller shaft through an electromagnetic clutch or brake C.

The above-mentioned conventional electromagnetic clutches or brakes C comprise an electromagnet and friction disks or brake shoes. In order to transmit the power of the engine A and the motor B, large friction disks and a powerful electromagnet are needed.

The electromagnet consumes much power and produces much heat because it has to be kept activated to keep the engine A and/or the motor B coupled to the drive train.

Also, friction disks and brake shoes tend to wear quickly and cause slippage. They are thus short-lived.

An object of this invention is to provide a power transmission device suited for use in a hybrid car for selective transmission of its engine and motor powers.

SUMMARY OF THE INVENTION

According to this invention, there is provided a power transmission device for use in a hybrid car for transmitting and cutting off driving force from an internal combustion engine or a motor, the device comprising a two-way clutch including engaging elements, and a control mechanism for controlling the two-way clutch to lock and free it.

Other features and objects of the present invention will become apparent from the following description made with reference to the accompanying drawings, in which:

BRIEF DESCRIPTION OF THE DRAWINGS

FIG. 12 is a travel chart of the hybrid car carrying the power transmission device of the second embodiment;

FIG. 16 is a plan view showing the layout of a hybrid car carrying the power transmission device of the fourth embodiment; and FIGS. 17A and 17B are plan views showing the layout of a conventional hybrid car.

DETAILED DESCRIPTION OF THE PREFERRED EMBODIMENT

Figure 1:
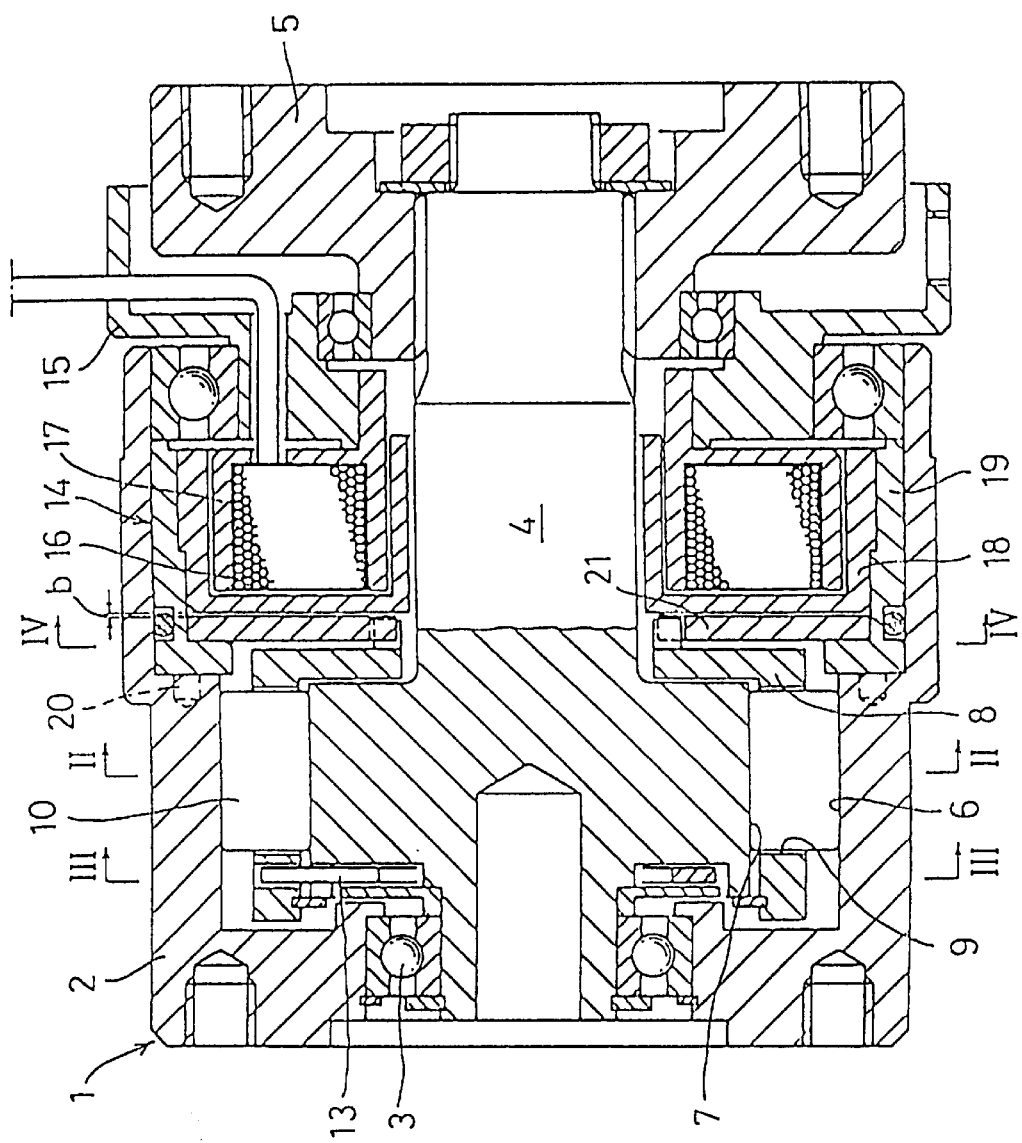
FIG. 1 is a vertical sectional view of a power transmission device of a first embodiment.

Embodiments of this invention are described with reference to the drawings.

(First Embodiment)

FIGS. 1 to 5 show the first embodiment. The power transmission device 1 of this embodiment comprises an outer ring 2 as a driven member, and an input shaft 4 as a driving member rotatably supported in the outer ring 2 through a bearing 3. An input ring 5 is mounted on the input shaft 4 at one end thereof through splines.

The outer ring 2 has a cylindrical surface 6 on its inner periphery. The input shaft 4 has a large-diameter portion having a plurality of flat cam surfaces 7 on its outer periphery at regular intervals opposite the cylindrical surface 6. A wedge-like space narrowing toward both circumferential ends is defined between each cam surface 7 and the cylindrical surface 6.

An annular retainer 8 is mounted on the large-diameter portion of the input shaft 4. The retainer 8 has circumferentially arranged pockets 9 each corresponding to a cam surface 7. A roller 10 as an engaging element is received in each pocket 9 and supported on each cam surface 7. When moved by a predetermined distance in a circumferential direction by the retainer 8, the rollers 10 engage between the cam surfaces 7 and the cylindrical surface 6, thus interlocking the outer ring 2 and the input shaft 4.

Figure 3:
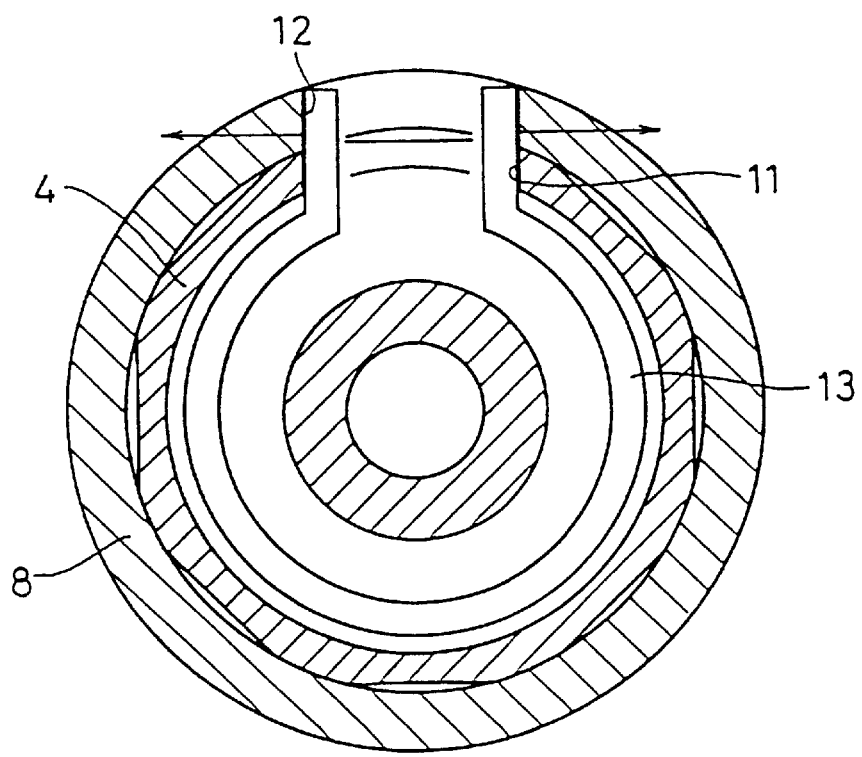
FIG. 3 is a sectional view taken along line III—III of FIG. 1.
Figure 4:
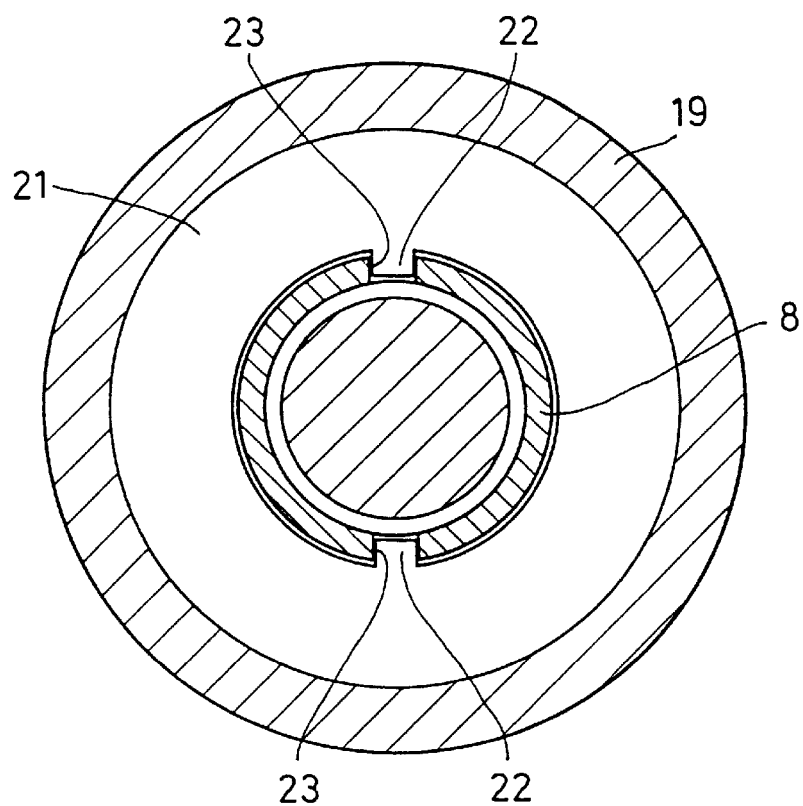
FIG. 4 is a sectional view taken along line IV—IV of FIG. 1.
Figure 5:
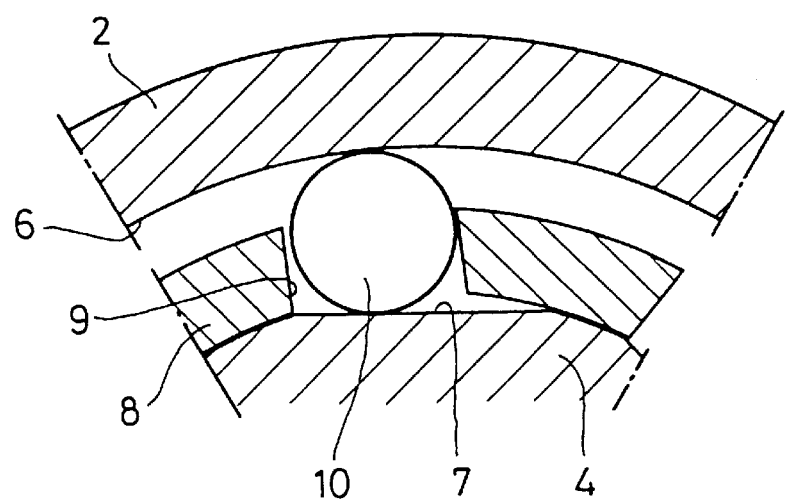
FIG. 5 is a sectional view taken along line II—II of FIG. 1 showing a locked state.

As shown in FIG. 3, the retainer 8 and the input shaft 4 have cutouts 11 and 12, respectively. An elastic member or switch spring 13 has both ends thereof engaged in the cutouts in a deflected state.

Figure 2:
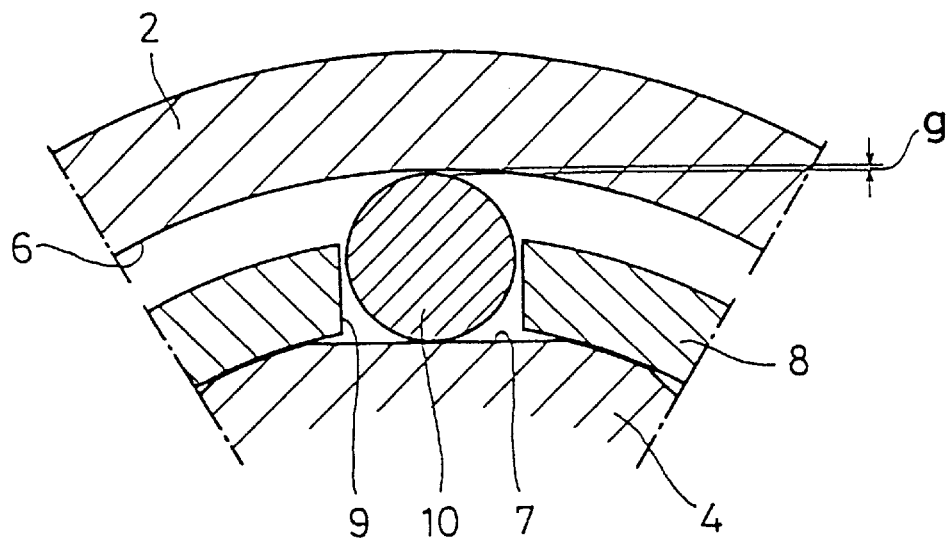
FIG. 2 is an enlarged sectional view taken along line II—II of FIG. 1.

When the cutouts 11 and 12 are in alignment, the cam surfaces 7 on the input shaft 4, the pockets 9 of the retainer 8, and the rollers 10 are positioned relative to each other as shown in FIG. 2, so that a gap g is present between each roller 10 and the outer ring 2. In this state, the input shaft 4 and the outer ring 2 are not locked together and are rotatable relative to each other. This is a neutral position.

As shown in FIG. 1, an electromagnetic clutch 14 is mounted between the input shaft 4 and the outer ring 2. It includes a field core 17 nonrotatably pressed into a fixed member 15 partially outwardly protruding from one end of the outer ring 2, an electromagnetic coil 16 housed in the field core 17, and a rotor 18 rotatably mounted on the field core 17 and pressed into a rotor guide 19 of a nonmagnetizable material so as to be nonrotatable. The rotor guide 19 is received in the outer ring 2 and held nonrotatable relative to the outer ring 2 by pins 20.

Thus, the field core 17 is a nonrotatable fixed member, while the outer ring 2, rotor guide 19 and rotor 18 are nonrotatable relative to each other at any time. The rotor 18 is a friction member fixed to the outer ring 2.

21 An armature 21 is received in the space between the opposed ends of the rotor 18 and the retainer 8, and has protrusions 22 engaged in cutouts 23 formed in the retainer 8 so as to be nonrotatable but axially movable relative to the retainer 8. The thickness of the armature 21 determined such that there is a gap b (FIG. 1) between the armature 21 and the rotor 18. The gap b permits relative rotation between the armature 21 and the rotor 18.

Since the rotor 18 is coupled to the outer ring 2 and the armature 21 is coupled to the input shaft 4 through the retainer 8 and the switch spring 13, the outer ring 2 and the input shaft 4 are rotatable relative to each other.

In the first embodiment, while the electromagnetic coil 16 is off, the rollers 10 are kept in their neutral position on the cam surfaces 7 by the switch spring 13, so that the input shaft 4 and the outer ring 2 are rotatable relative to each other in either direction.

When the electromagnetic coil 16 is turned on, the rollers 10 will move to a position where they can engage the input shaft 4 and the outer ring 2. When the rollers engage, the input shaft 4 and the outer ring 2 are locked together and become nonrotatable relative to each other. Thus, this clutch is a two-way clutch because it can be driven in both directions.

Even if current to the electromagnetic coil 16 is turned off while an engaging torque is acting in such a locked state, the torque acting on the rollers 10 prevents the rollers from returning to their neutral position under the force of the switch spring 13. Thus, the torque is continuously transmitted through the clutch.

Figure 6:
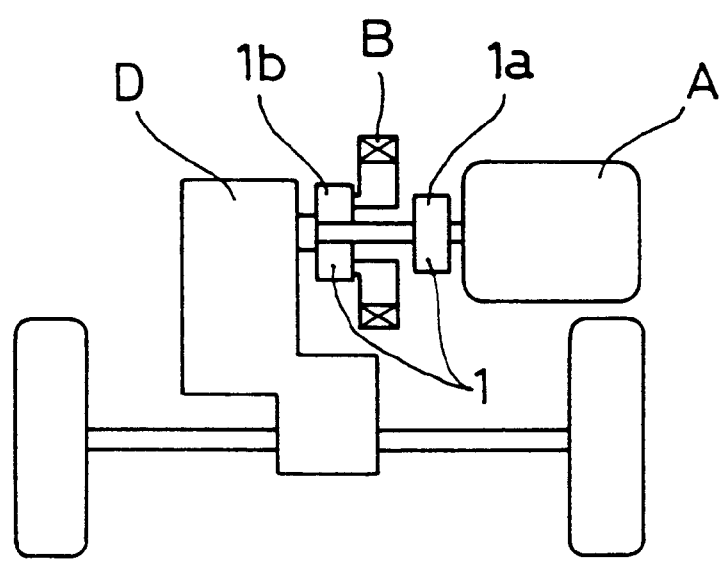
FIG. 6 is a plan view showing the layout of a hybrid car on which is mounted the power transmission device of the first embodiment.
Figure 7:
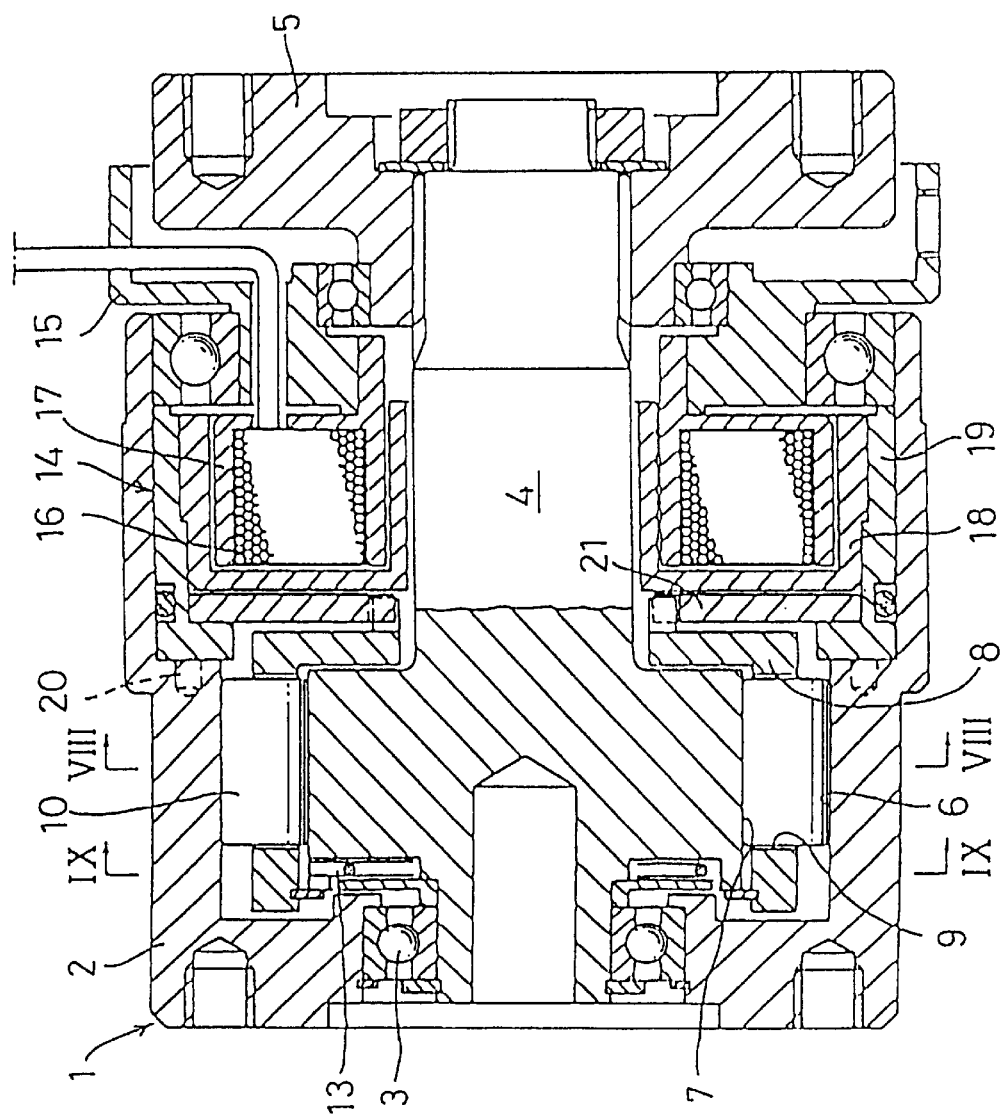
FIG. 7 is a vertical sectional view of the power transmission device of a second embodiment.
Figure 8:
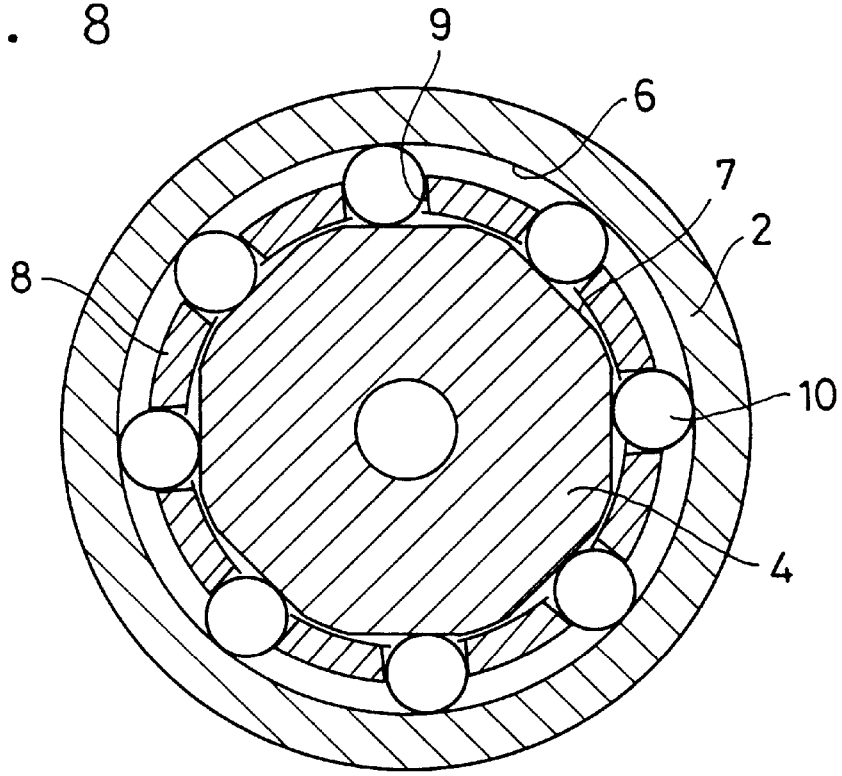
FIG. 8 is a sectional view taken along line VII—VII of FIG. 7.

FIG. 6 shows how the power transmission device 1 of the first embodiment is used as a clutch for a hybrid car.

In FIG. 6, the output of the engine A and the output of the motor are coupled in parallel to the transmission D such as a non-stage transmission through the power transmission device 1 of the embodiment.

While the car is traveling at a low speed or when started, it is driven by the motor B alone. For this purpose, the power transmission device 1a for the engine A is disengaged by keeping off the supply of current to its electromagnetic coil 16 to shut off the engine power. The engine A is stopped in this state.

On the other hand, the electromagnetic coil 16 of the power transmission device 1b mounted for the motor B is turned on to move the rollers 10 into engagement with the cam surfaces 7 and the outer ring 2 and thus transmit the motor power to the transmission D.

When the computer determines that torque is now being transmitted from the motor B to the transmission D based on an accelerator signal or a motor load signal, it stops supplying current to the electromagnetic coil 16 of the power transmission device 1b connected to the motor B. Even if the coil is deenergized, the rollers 10 remain in engagement with the cam surfaces 7 and the outer ring 2 while torque is being transmitted through the device 1b, so that torque can be transmitted from the motor B to the transmission D with minimum power consumption.

During high-speed cruising in which engine efficiency is high, the car should be driven by the engine A alone. Thus, the electromagnetic coil 16 of the power transmission device 1a for the engine A is turned on to transmit the power of the engine A to the transmission D. If the rotor in the motor B is rotating, the permanent magnet of the motor B will apply a braking or dragging force to the drive train. Thus, the electromagnetic coil 16 of the power transmission device 1b for the motor B is turned off to stop its rotor.

For abrupt start or rapid acceleration, both the engine power and the motor power are needed, so that current to the electromagnetic coils 16 of the power transmission devices for the motor B and the engine A are both turned on to transmit both the engine and motor powers to the transmission D.

During deceleration, the electromagnetic coil 16 of the power transmission device 1b for the motor B is turned on to use the motor B as a generator for regeneration. In this state, the rollers 10 engage the cam surfaces 7 on their sides opposite to the sides where the rollers 10 engage during acceleration. Once torque is transmitted to the motor B and the motor begins to generate electricity, even if the electromagnetic coil 16 is turned off, the rollers 10 remain engaged, so that it is possible to suppress power consumption for the power transmission device 1b. If the engine brake is needed besides the motor brake, the electromagnetic coil 16 of the power transmission device 1a for the engine A is also turned on.

(Second Embodiment)

FIGS. 7 to 12 show the power transmission device 1 of the second embodiment. In this and subsequent embodiments, the same elements as in the first embodiment are denoted by the same numerals and not described.

In the first embodiment, while the electromagnetic coil 16 is not energized, the rollers 10 are kept by the switch spring 13 in the neutral position where they do not engage in either direction. In this embodiment, while the electromagnetic coil 16 is off, the rollers 10 are pressed to one side of the cam surfaces 7 by the switch spring 13 so that they are kept in an engageable stand-by position where drive in one direction is always possible.

Figure 9:
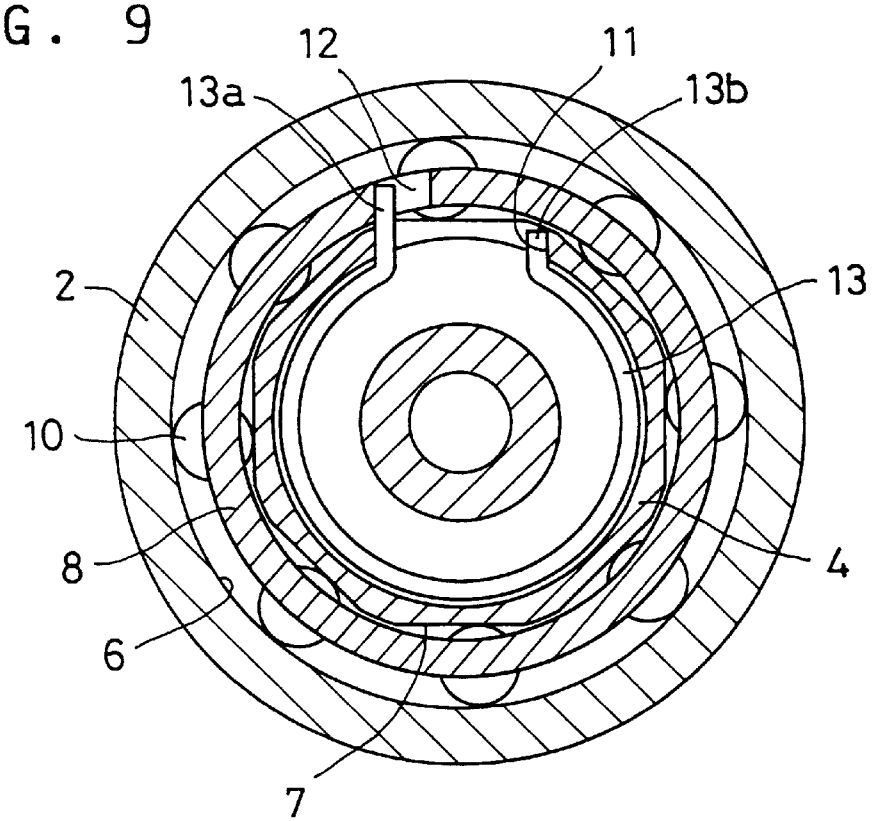
FIG. 9 is a sectional view taken along line IX—IX of FIG. 7.

Specifically, as shown in FIG. 9, the switch spring 13 has a long end 13a engaged in the cutout 12 of the retainer 8 and a short end 13b engaged in the cutout 11 of the input shaft 4 to urge the retainer 8 so as to rotate counterclockwise in FIG. 9 relative to the input shaft 4.

Figure 10A:
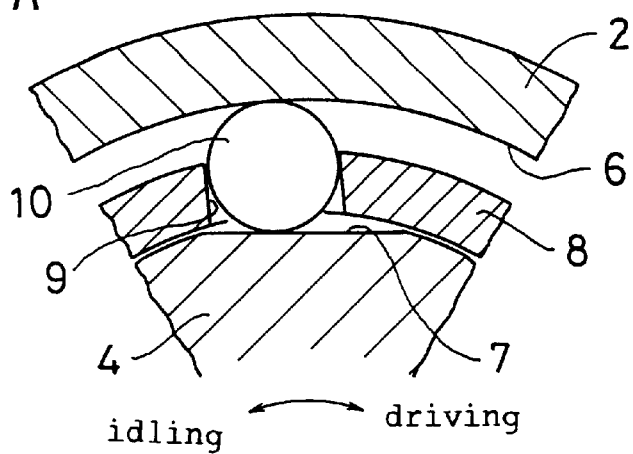
FIGS. 10A–10C are sectional views of the two-way clutch showing its operation.
Figure 10B:
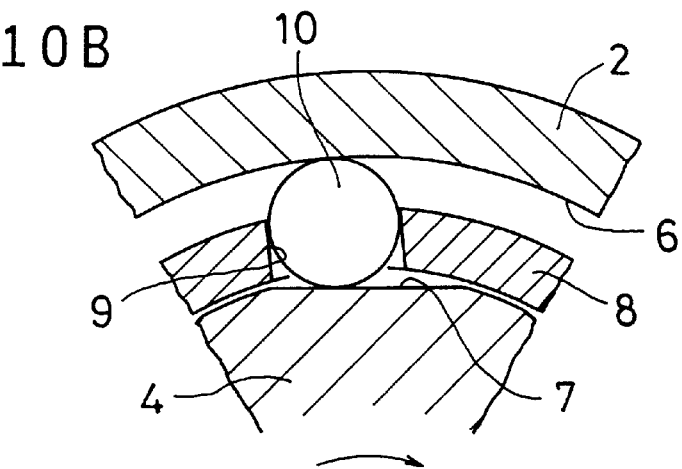

Since the rollers 10 are urged toward one side of the cam surfaces 7 through the retainer 8 as shown in FIG. 10A, while the electromagnetic coil 16 is off, this power transmission device 1 acts as a one-way clutch. That is, when the input shaft 4 is about to rotate faster than the outer ring 2 in one direction, the rollers 10 engage, so that the outer ring 2 is driven by the input shaft 4. When the outer ring 2 begins to rotate faster than the input shaft, the rollers 10 will disengage, so that the outer ring 2 can rotate faster than the input shaft.

Figure 10C:
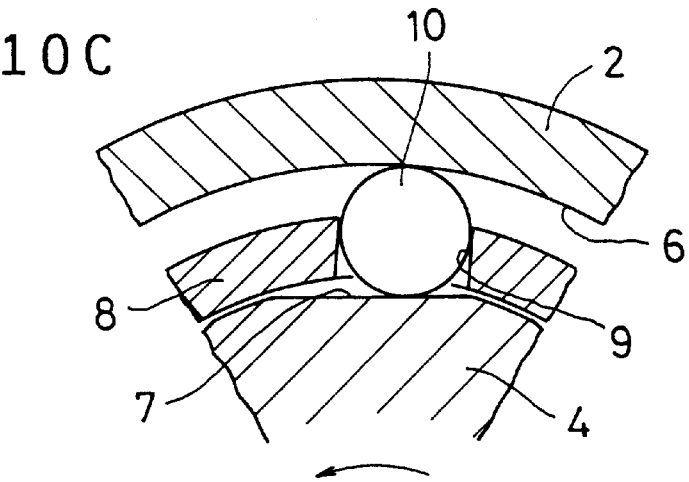

On the other hand, when the electromagnetic coil 16 is energized, the armature 21 coupled to the retainer 8 magnetically attracts the rotor 18 coupled to the outer ring 2, so that even if the outer ring 2 begins to rotate faster than the input shaft 4, the retainer 8 rotates together with the outer ring 2 due to the frictional force between the armature and the rotor. The rollers 10 thus engage the opposite side of the cam surfaces 7 as shown in FIG. 10C, locking the outer ring 2 and the input shaft 4 together.

That is, the power transmission device 1 of the second embodiment functions as a one-way clutch while the electromagnetic coil 16 is off. While it is on, the outer ring 2 and the input shaft 4 are locked together.

Figure 11:
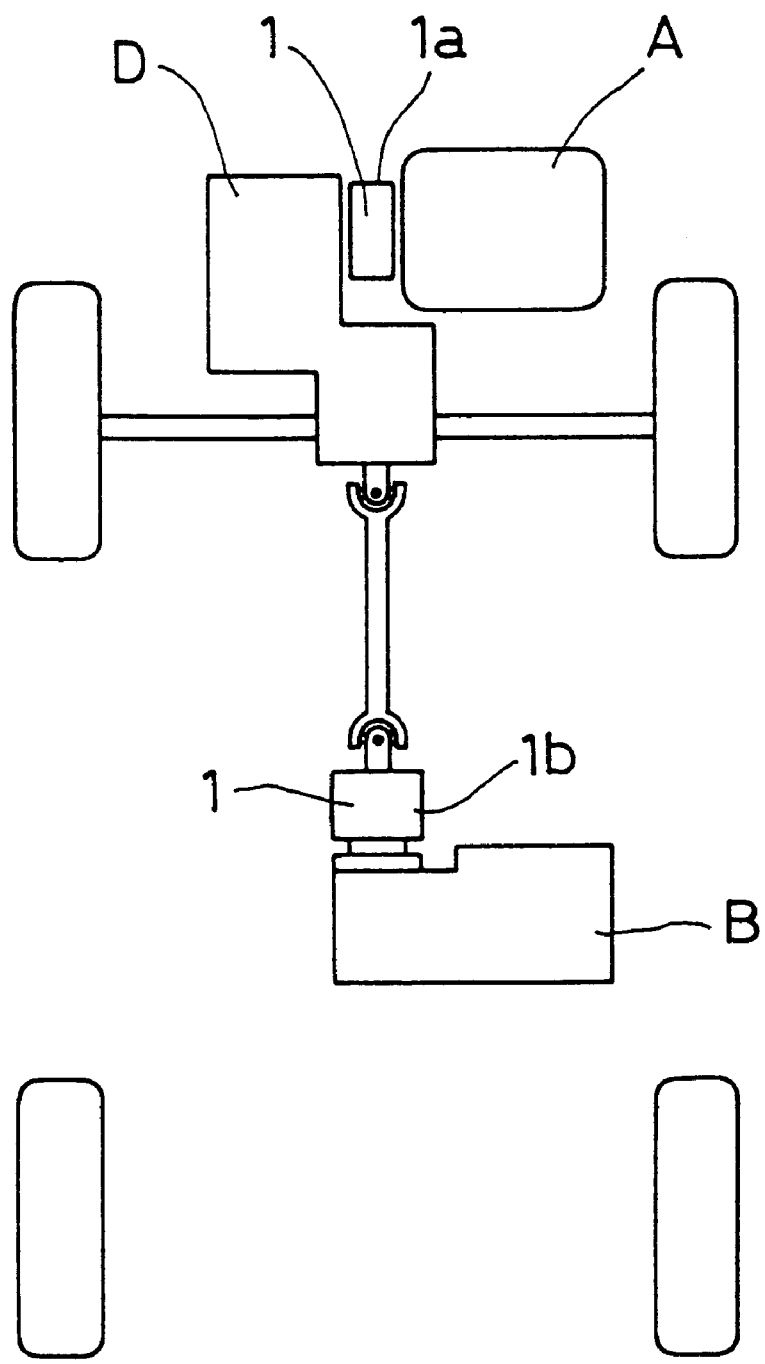
FIG. 11 is a plan view showing the layout of a hybrid car carrying the power transmission device of the second embodiment.

FIG. 11 shows the power transmission device 1 of this embodiment used as clutches for a hybrid car.

Ordinarily, this hybrid car is driven by the engine A alone. During acceleration, the motor B assists the engine A. During deceleration, the motor B acts as a generator for regeneration.

In FIG. 11, driving force from the engine A is transmitted to the output shaft (that is, front differential) through the transmission. The power transmission device 1 of the second embodiment is mounted between the motor B with a speed reducer and the output shaft. This power transmission device 1 is mounted such that the output shaft can be driven by the motor B while the electromagnetic coil 16 is off (that is, one-way clutch mode) and the vehicle is moving forward.

As shown in the travel chart of FIG. 12, when the car has started or is accelerating, by driving the motor B faster than the engine A, the power transmission device 1 engages automatically due to its one-way clutch function, so that the car accelerates under the combined force of the engine A and the motor B.

On the other hand, while the car is traveling at a constant speed, since the load on the engine is low, the motor B is stopped. At this time, the power transmission device 1 is free wheeling, so that the outer ring 2 rotates faster than the input shaft 4.

While the car is decelerating, the motor B is used as a recharger or regenerator. For this purpose, while the car is decelerating, after the motor B has been brought into synchronization with the output shaft, the electromagnetic coil 16 of the power transmission device 1 is activated to lock the power transmission device 1. When the motor B is slowed down in this state, it is rotated by the vehicle traction wheels and thus begins to generate electricity, which is stored in the car battery.

The power transmission device 1 of the second embodiment makes it possible to add the power of the motor B to the output shaft whenever necessary, irrespective of its rotating direction. In particular, since the switch spring 13 keeps the rollers 10 at a standby position at one end of the cam surfaces 7, the motor power can be used to assist the engine without the necessity to turn on the electromagnetic coil 16. Also, while the car is moving forward at a constant speed, whenever no motor assistance is necessary, the motor can be disconnected from the output shaft.

(Third Embodiment)

Figure 13A:
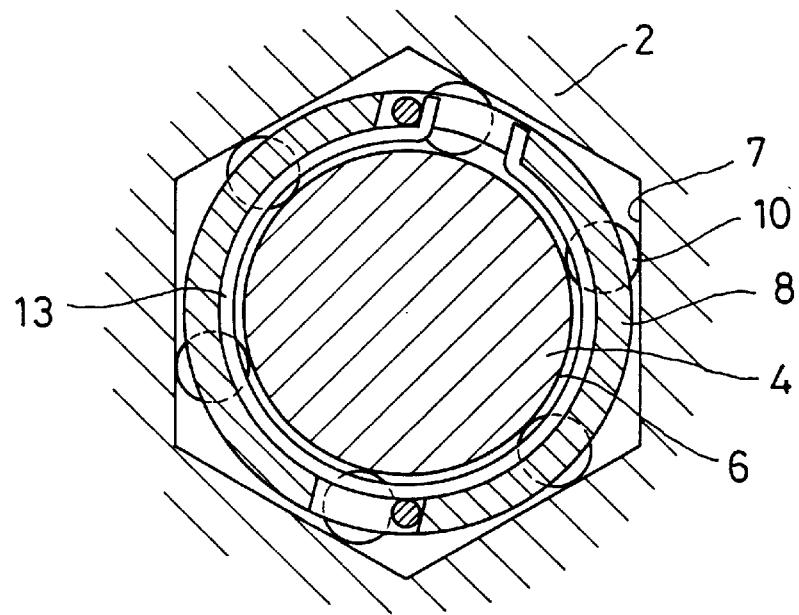
FIGS. 13A–13B are partial vertical sectional views of the 2-way clutch of the power transmission device of a third embodiment.
Figure 13B:
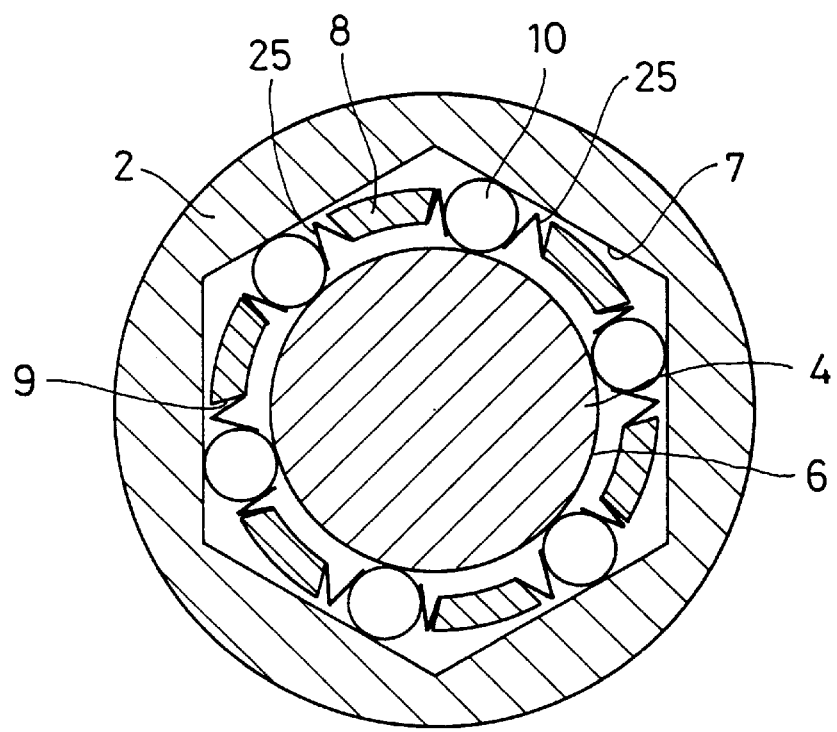

FIGS. 13A and 13B show the power transmission device 1 of the third embodiment, which includes an outer ring 2 having cam surfaces 7 on its inner periphery and an input shaft 4 having a cylindrical outer surface 6 opposite the cam surfaces 7. In this embodiment, the switch spring 13 engages between the retainer 8 and the outer ring 2 to urge the rollers 10 to one end of the cam surfaces 7 to bring the device to an engaging standby position.

As shown in FIG. 13B, leaf springs 25 are preferably disposed between the inner walls of the pockets 9 of the retainer 8 and the rollers 10 to stabilize the rollers 10. The same leaf springs 25 may also be used in the power transmission device 1 of the first embodiment.

The power transmission device 1 of the third embodiment operates and is mounted on a hybrid car in the same manner as the power transmission device of the second embodiment.

(Fourth Embodiment)

Figure 14A:
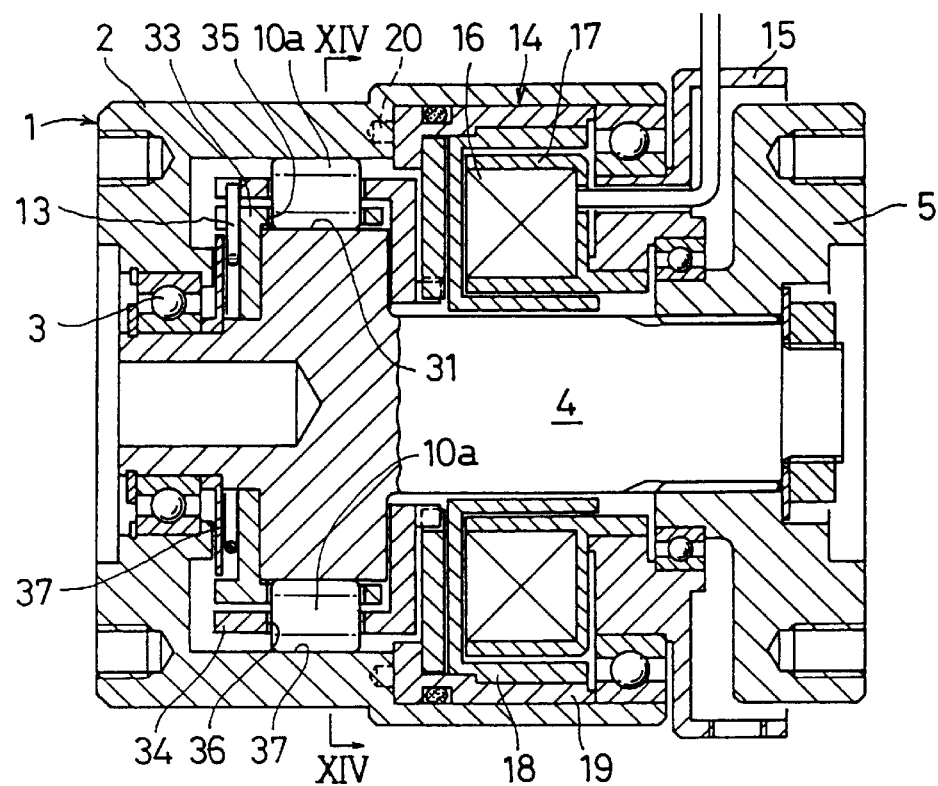
FIG. 14A is a vertical sectional view of the power transmission device of a fourth embodiment.
Figure 14B:
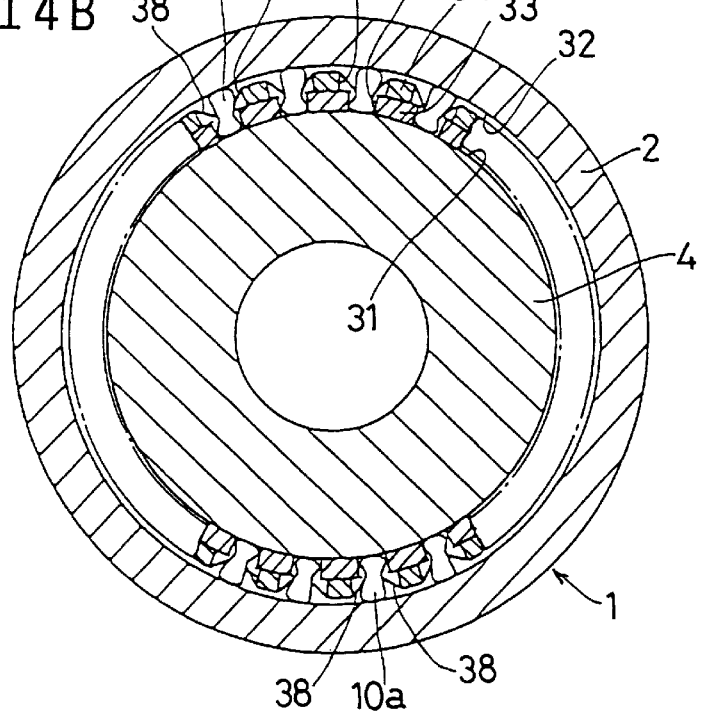
FIG. 14B is a vertical sectional view taken along line XIV—XIV of FIG. 14A.
Figure 15A:
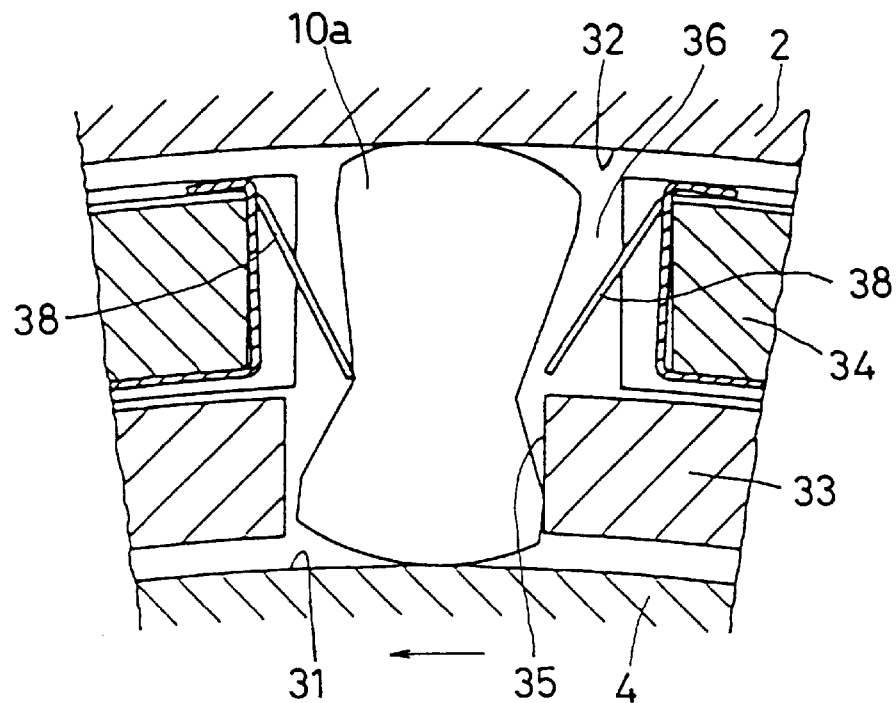
FIGS. 15A and 15B are sectional views of the two-way clutch showing its operation.
Figure 15B:
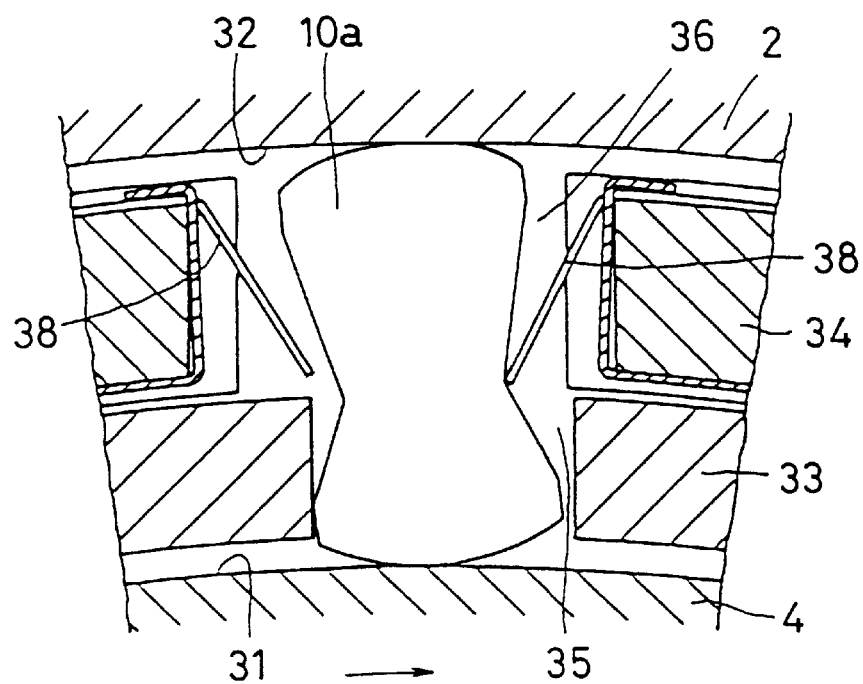

FIGS. 14 and 15 show a power transmission device of the fourth embodiment in which the engaging elements of the two-way clutch are sprags 10a.

As shown in FIGS. 14A and 14B, a large and a small retainer 33 and 34 are disposed between cylindrical surfaces 31 and 32 of the input shaft 4 and the outer ring 2. The sprags 10a are received in pockets 35 and 36 formed in the retainers 33, 34 so as to be engageable in either direction. When the sprags 10a are inclined by the retainers 33 and 34, they become engageable with the input shaft 4 and the outer ring 2. One advantage of the sprags 10a is that, compared with the rollers 10 used in the first to third embodiments, a greater number of sprags 10a can be received in the same space, so that it is possible to increase the maximum permissible torque while keeping the device compact.

As shown in FIG. 14A, the small-diameter retainer 33 is pressed against the input shaft 4 by a cone spring 37. A spring 38 is engaged between the large-diameter and small-diameter retainers 34 and 33 to urge them so that their pockets 35, 36 displace in one direction from each other, thereby inclining the sprags 10a to form a one-way clutch.

The large-diameter retainer 34 is slidably but relatively nonrotatably coupled to the armature 21. The same electromagnetic clutch as used in the first to third embodiments is used in this embodiment.

In the fourth embodiment, while the electromagnetic coil 16 is off, no frictional torque is produced between the armature 21 and the rotor 18, so that they are free. Thus, the device functions as one-way clutch.

When the electromagnetic coil 16 is activated, the armature 21 and the rotor 18 are magnetically pressed against each other, so that the outer ring 2 and the large-diameter retainer 34 are rigidly coupled together through the armature 21 and the rotor 18.

In this state, when the input shaft 4 and the outer ring 2 tend to rotate relative to each other, the small-diameter retainer 33 and the large-diameter retainer 34 begin to rotate relative to each other, so that the sprags 10a will engage as shown in FIG. 15, thereby rigidly coupling the input shaft 4 and the outer ring 2 together.

In the embodiments thus far described, the input shaft 4 is used as an input member. But the outer ring 2 may be used as an input member instead. Such use is within the scope of this invention.

The layouts of the engine A and the motor B in these embodiments are mere examples, and various other variations are feasible. The power transmission device 1 of this invention may be used as a clutch for selectively transmitting various kinds of power outputs according to the layout of the engine A and the motor B.

For example, FIG. 16 shows a layout for 4 wheel drive cars in which the engine A drives the front vehicle wheels while the motor B drives the rear wheels. In this arrangement, the power transmission device of this invention may be coupled to the output of the motor B.

As described above, by mounting the device of the present invention on the output line of the internal combustion engine or the motor of a hybrid car, driving force can be easily transmitted and cut off simply by turning on and off the current to the electromagnet.

When compared with an electromagnetic brake, large torque transmission is possible while size is kept compact, and the weight is small. Also, power consumption is small, and less heat is produced. Wear is extremely small, so that its life is long and reliability is high. Thus, this device is suited for transmission and cutoff of driving force in a hybrid car.

What is claimed is:

1. A power transmission device for use in a hybrid car for transmitting and cutting off driving force from an internal combustion engine or a motor to or from a drive train, said power transmission device comprising:

a two-way clutch including
   (i) an outer ring;
   (ii) an inner member mounted within said outer ring, with said outer ring and said inner member having surfaces that are opposed to one another, wherein one of the opposed surfaces defines a cylindrical surface and the other of the opposed surfaces includes cam surfaces that face said cylindrical surface such that respective wedge-shaped spaces are formed between said cylindrical surface and said cam surfaces;
   (iii) a retainer mounted between the opposed surfaces of said outer ring and said inner member, said retainer including pockets positioned between said cylindrical surface and said cam surfaces;
   (iv) rollers received within said pockets, respectively, such that as said outer ring rotates relative to said inner member said rollers become engaged with said cylindrical surface and a respective one of said cam surfaces; and
   (v) an elastic member, mounted to said retainer and said outer ring or to said retainer and said inner member, for exerting a force against said rollers to urge said rollers in one relative rotational direction of said outer ring and said inner member toward a neutral position in which said rollers are disengaged from said cylindrical surface and a respective one of said cam surfaces; and a control unit for controlling said two-way clutch such that the driving force from the internal combustion engine or the motor is either transmitted to the drive train or cut off from the drive train by biasing said rollers, against the force exerted by the elastic member, into said wedge-shaped spaces, respectively, and into engagement with said cylindrical surface and a respective one of said cam surfaces.

2. The power transmission device according to claim 1, wherein said control unit comprises an electromagnetic clutch including an electromagnet and an armature.

3. The power transmission device according to claim 2, wherein said armature is relatively non-rotatably and axially movably coupled to said retainer, said electromagnet is for attracting said armature, and said control unit further includes a friction member fixed to said inner member or said outer ring.

4. The power transmission device according to claim 3, further comprising leaf springs respectively received within said pockets between inner walls of a respective said pocket and a respective said roller.

5. The power transmission device according to claim 4, wherein the opposed surface that defines said cylindrical surface comprises an inner surface of said outer ring, and the opposed surface that includes said cam surfaces comprises an outer surface of said inner member.

6. The power transmission device according to claim 4, wherein said elastic member is mounted to said retainer and said inner member.

7. The power transmission device according to claim 6, wherein said elastic member comprises a switch spring having spaced ends, and wherein said elastic member is mounted to said retainer and said inner member by having said spaced ends be received within a cutout of said retainer and a cutout of said inner member.

8. The power transmission device according to claim 3, wherein said friction member is non-rotatably fixed to said outer ring.

9. The power transmission device according to claim 2, and further comprising leaf springs respectively received within said pockets between inner walls of a respective said pocket and a respective said roller.

10. The power transmission device according to claim 2, wherein the opposed surface that defines said cylindrical surface comprises an inner surface of said outer ring, and the opposed surface that includes said cam surfaces comprises an outer surface of said inner member.

11. The power transmission device according to claim 2, wherein said elastic member is mounted to said retainer and said inner member.

12. The power transmission device according to claim 11, wherein said elastic member comprises a switch spring having spaced ends, and wherein said elastic member is mounted to said retainer and said inner member by having said spaced ends be received within a cutout of said retainer and a cutout of said inner member.

13. The power transmission device according to claim 1, wherein said control unit includes an armature that is relatively non-rotatably and axially movably coupled to said retainer, an electromagnet for attracting said armature, and a friction member fixed to said inner member or said outer ring.

14. The power transmission device according to claim 13, and further comprising leaf springs respectively received within said pockets between inner walls of a respective said pocket and a respective said roller.

15. The power transmission device according to claim 13, wherein said friction member is non-rotatably fixed to said outer ring.

16. The power transmission device according to claim 1, and further comprising leaf springs respectively received within said pockets between inner walls of a respective said pocket and a respective said roller.

17. The power transmission device according to claim 16, wherein the opposed surface that defines said cylindrical surface comprises an inner surface of said outer ring, and the opposed surface that includes said cam surfaces comprises an outer surface of said inner member.

18. The power transmission device according to claim 16, wherein said elastic member is mounted to said retainer and said inner member.

19. The power transmission device according to claim 18, wherein said elastic member comprises a switch spring having spaced ends, and wherein said elastic member is mounted to said retainer and said inner member by having said spaced ends be received within a cutout of said retainer and a cutout of said inner member.

20. The power transmission device according to claim 1, wherein the opposed surface that defines said cylindrical surface comprises an inner surface of said outer ring, and the opposed surface that includes said cam surfaces comprises an outer surface of said inner member.

21. The power transmission device according to claim 1, wherein said elastic member is mounted to said retainer and said inner member.

22. The power transmission device according to claim 21, wherein said elastic member comprises a switch spring having spaced ends, and wherein said elastic member is mounted to said retainer and said inner member by having said spaced ends be received within a cutout of said retainer and a cutout of said inner member.

* * * * *